United States Patent
Alkhalaf et al.

(10) Patent No.: US 11,725,130 B2
(45) Date of Patent: Aug. 15, 2023

(54) SODIUM LIGNOSULFONATE AS A RETARDER ADDITIVE FOR OIL AND GAS WELLS CEMENTING

(71) Applicant: SAUDI ARABIAN OIL COMPANY, Dhahran (SA)

(72) Inventors: Sara Abdulaziz Alkhalaf, Alkhobar (SA); Abdullah Al-Yami, Dhahran (SA); Vikrant Wagle, Dhahran (SA); Ali Alsafran, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/494,406

(22) Filed: Oct. 5, 2021

(65) Prior Publication Data

US 2023/0108150 A1    Apr. 6, 2023

(51) Int. Cl.
  *C09K 8/467*    (2006.01)
  *C09K 8/42*    (2006.01)

(52) U.S. Cl.
  CPC ............ *C09K 8/467* (2013.01); *C09K 8/426* (2013.01)

(58) Field of Classification Search
  None
  See application file for complete search history.

(56) References Cited

U.S. PATENT DOCUMENTS

| | | |
|---|---|---|
| 3,753,748 A | 8/1973 | Martin |
| 4,098,613 A * | 7/1978 | Maravilla .......... C04B 7/52 |
| | | 106/722 |
| 4,149,900 A * | 4/1979 | Childs ................ C09K 8/46 |
| | | 106/803 |
| 4,504,317 A | 3/1985 | Smeltzer et al. |
| 4,990,191 A | 2/1991 | Schilling |
| 5,503,672 A | 4/1996 | Barlet-Gouedard et al. |
| 6,372,037 B1 * | 4/2002 | Lebo, Jr. ............ C09K 8/46 |
| | | 106/820 |
| 6,907,928 B2 | 6/2005 | Di Lullo Arias et al. |
| 8,550,162 B2 | 10/2013 | Michaux et al. |

(Continued)

FOREIGN PATENT DOCUMENTS

| CN | 106145743 A | 11/2016 |
|---|---|---|
| EP | 2709964 B1 | 7/2019 |

(Continued)

OTHER PUBLICATIONS

Arel, H. S. and Aydin, E.; "Effects of Ca-, Mg-, K-, and Na-lignosulfonates on the behavior of fresh concrete", Construction and Building Materials; vol. 157; Oct. 5, 2017; pp. 1084-1091 (8 pages).

(Continued)

*Primary Examiner* — Anuradha Ahuja
(74) *Attorney, Agent, or Firm* — Osha Bergman Watanabe & Burton LLP

(57) ABSTRACT

A cement slurry in a downhole well has a composition that includes a cement in an amount of 60% to 80% by weight of the cement slurry, water in an amount of 20% to 40% by weight of the cement slurry, and a retarder in an amount of 0.1% to 2% by weight of the cement slurry. The cement includes 70% to 90% of at least one silicate by weight of the cement. The retarder includes sodium lignosulfonate with an alkali content of no more than 5.0 g $Na_2O$ equivalent/liter of admixture.

18 Claims, 5 Drawing Sheets

(56) References Cited

U.S. PATENT DOCUMENTS

| | | |
|---|---|---|
| 8,551,240 B2 | 10/2013 | Michaux et al. |
| 9,410,072 B2 | 8/2016 | Scoggins |
| 9,932,269 B2 | 4/2018 | Zubrod |
| 9,975,807 B2 | 5/2018 | Michaux et al. |
| 10,196,310 B2 | 2/2019 | Zubrod et al. |

FOREIGN PATENT DOCUMENTS

| | | | | |
|---|---|---|---|---|
| WO | WO 93/21122 | * | 10/1993 | ............... C04B 7/02 |
| WO | 2001036344 A2 | | 5/2001 | |

OTHER PUBLICATIONS

Tong et al.; "Recent advances in chemical admixtures for improving the workability of alkali-activated slag-based material systems", Construction and Building Materials; vol. 272; Nov. 8, 2020 (14 pages).

* cited by examiner

SODIUM LIGNOSULFONATE AS A RETARDER ADDITIVE FOR OIL AND GAS WELLS CEMENTING

BACKGROUND

In the oil and gas industry, cements are used in cementing operations to provide zonal isolation, protect well pipes and casings from corrosion, and provide structural support for casings inside a wellbore. Hydraulic cement is a kind of cement that sets and hardens (develops compressive strength) by chemical reaction with water (hydration) and is capable of doing so under water. The hydration reactions result in the formation of a hard, solid mass that will not dissolve in water. Hydraulic cements, for instance, may include Portland cements, aluminous cements, pozzolan cements, fly ash cements, magnesia cements (Sorel cements), and the like.

In cementing operations, a cement is mixed with water and additives to form a cement slurry, which is then pumped down into the wellbore through casing to critical points in the annulus around the casing or in the open hole below the casing string. Upon introduction to the wellbore, cements can quickly develop compressive strength and keep developing greater strength while hydration continues as time progresses. The cementing of well pipes and casings requires the cement slurry to exhibit a pumpable viscosity, good fluid loss control, minimal settling of particles, and the ability to set within a practical time at elevated temperatures.

Cement slurries for wells in the oil and gas industry are designed to ensure operable properties including mixability, stability, rheology, fluid loss, and adequate thickening time. Additives, including retarders, fluid loss additives, dispersants, gas migration additives and expansion additives, may be used to achieve desired properties. For example, cements commonly used in wellbores do not have a sufficiently long thickening time (also referred to as fluid life) for use at a temperature above 100° F. (38° C.). To extend the thickening time, retarders are used to decrease the speed of cement hydration and delay the setting of cement slurries.

Borax and boric acids may be used together with retarders. However, these chemicals may impair the fluid loss control or rheology of cement slurries due to incompatibility with other additives. Further, these chemicals may over-retard the cement slurries at certain temperatures. Over-retarded cement slurries may take a very long time to set, or even do not set. In addition, these chemicals may have poor solubility in water under ambient temperatures and may have toxicity to the environment.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a composition of a cement slurry that includes a cement in amount of 60% to 80% by weight of the cement slurry, wherein the cement comprises 70% to 90% of at least one silicate by weight of the cement; water in amount of 20% to 40% by weight of the cement slurry; and a retarder in amount of 0.1% to 2% by weight of the cement slurry, wherein the retarder comprises sodium lignosulfonate with an alkali content of no more than 5.0 g $Na_2O$ equivalent/liter of admixture.

In a further aspect, embodiments disclosed herein relate to a method for applying a cement slurry in a well. The cement slurry may be formed by mixing a cement, water, and a retarder, wherein the cement slurry has 60% to 80% of the cement, 20% to 40% of water, 0.1% to 2% of the retarder, by weight of the cement slurry, and wherein the retarder comprises sodium lignosulfonate with an alkali content of no more than 5.0 g $Na_2O$ equivalent/liter of admixture. Once mixed, the cement slurry may be pumped into the well.

Other aspects and advantages of the claimed subject matter will be apparent from the following description and the appended claims.

DETAILED DESCRIPTION

Figure 1:
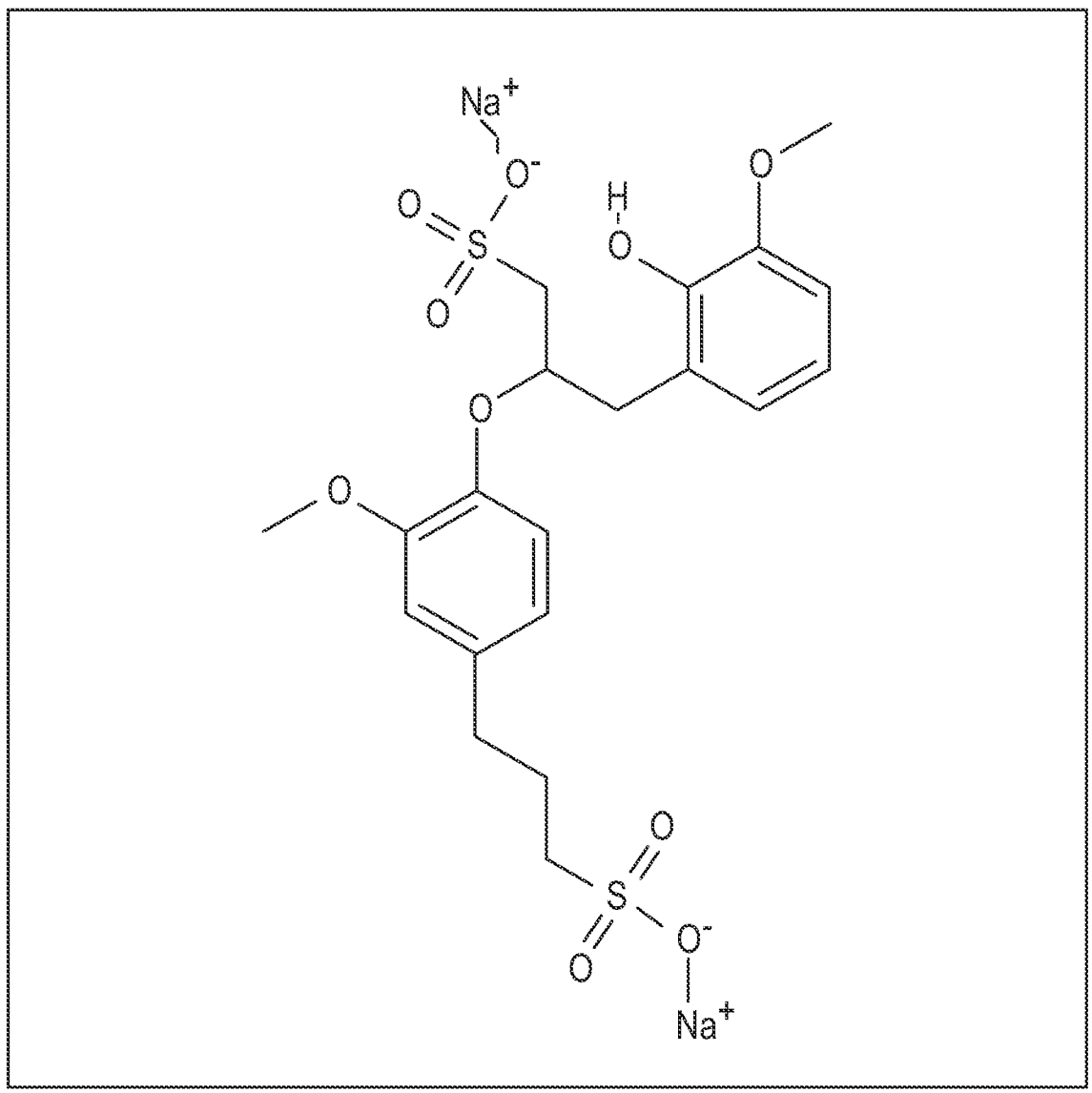
FIG. 1 shows the chemical structure of sodium lignosulfonate.

Specific embodiments of the disclosure will now be described in detail with reference to the accompanying figures. In the following detailed description, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

A cement slurry for an oil and gas well may be designed to ensure acceptable properties, such as mix-ability, stability, rheology, fluid loss, and adequate thickening time. Different chemicals may be used when designing cement slurries to achieve the desired properties, and may include, for example, retarders, fluid loss additives, dispersants, gas migration additives and expansion additives. In the present disclosure, the term "cement slurry" may include a cement, such as Portland cement, water, and other compounds.

Some oil and gas wells may operate at elevated temperatures, such as 125° F. (52° C.) or higher. Under an elevated temperature condition, thickening of cement may occur at a faster rate when compared with a lower or ambient temperature due to increased chemical reactivity of the cement slurry. Extension of cement thickening time under elevated temperatures has conventionally been achieved by addition of cement retarders or use of commercially available retarded cements that contain compounds such as lignin, gums, and starches. However, these conventionally used retarding compounds may not be compatible with other cement additives. Additionally, the thickening time may also be difficult to consistently control when using conventional retarding compounds.

Embodiments disclosed herein generally relate to cement slurries that include retarders for lengthening the thickening time of cement slurries when pumping the cement slurries downhole. As used herein, retarders refer to cement additives whose function is to retard or delay the thickening of cement slurries. Thickening time refers to the amount of time the cement slurry remains capable of being manipulated (e.g., amount of time the cement slurry is capable of being pumped downhole). Delaying the thickening of a cement slurry, i.e., increasing the thickening time of the cement slurry, may provide an extended amount of time to pump the cement slurry into a desired position in a well. Thickening time may be assessed under simulated well conditions, for example, using a consistometer that measures the cement slurry viscosity under predicted downhole temperature and pressure conditions. Cement slurries according to embodiments of the present disclosure may be used in various subterranean formations for primary and secondary cementing operations.

Embodiments disclosed herein also relate to a composition of a cement slurry that may be used in well cementing operations. The cement slurry may have an amount of a retarder that provides an increased thickening time to the cement slurry as it is pumped into a well. Further, the retarder in the cement slurry may provide improved performance and increased thickening time to the cement slurry in elevated downhole temperatures, e.g., 125° F. or greater. For example, by mixing retarders disclosed herein with a cement slurry, the cement slurry may have a thickening time of at least 4 hours under downhole temperatures of about 125° F. or greater. Additionally, when pumped under downhole conditions, including elevated downhole temperatures, the weight loss of the retarder may be no more than 50% by weight of the retarder.

Cement Slurry

According to embodiments of the present disclosure, a cement slurry may include at least a cement, water, and a retarder. The cement slurry may contain at least 50 wt %, or 50 wt % to 90 wt %, or 60 wt % to 80 wt % of a cement by weight of the cement slurry. For example, a cement slurry may include a cement in an amount ranging from about 60% to 80% by weight of the cement slurry or in an amount ranging from 65% to 75% by weight of the cement slurry. The cement slurry may contain an amount of the retarder ranging from about 0.1 wt % to 2 wt %, or 0.5 wt % to 1.5 wt %, or 0.5 wt % to 1 wt %, by weight of the cement slurry. The cement slurry may contain an amount of water ranging from about 20 wt % to 50 wt %, or 20 wt % to 40 wt %, or 25 wt % to 35 wt % of the cement slurry. In some embodiments, the weight ratio of water versus cement (referred to as the water to cement ratio) may be at least 0.3. In some embodiments, the water to cement ratio may be between 0.3 to 0.5, or between 0.5 to 0.8.

Water used in cement slurries of the present disclosure may include one or more known compositions of water, including distilled; condensed; filtered or unfiltered fresh surface or subterranean waters, such as water sourced from lakes, rivers or aquifers; mineral waters; gray water; run-off, storm or waste water; potable or non-potable waters; brackish waters; synthetic or natural sea waters; synthetic or natural brines; formation waters; production water; and combinations thereof. Cement slurries may contain water in an amount sufficient to cure the cement.

A cement slurry may include a retarder according to embodiments of the present disclosure in an amount from about 0.1 liters (L)/100 kg of cement slurry to 0.6 L/100 kg of cement slurry. For example, a cement slurry may include an amount of a retarder mixture ranging from a lower limit selected from 0.1, 0.2, or 0.3 L/100 kg of cement slurry to an upper limit of 0.5, 0.55, or 0.6 L/100 kg of cement slurry, where any lower limit may be paired with any upper limit.

Cements

Cements according to embodiments of the present disclosure may be formed of a combination of oxides. For example, a cement may include at least one of the following oxides, which are listed with their abbreviations:

| | | | | |
|---|---|---|---|---|
| C = CaO | F = $Fe_2O_3$ | N = $Na_2O$ | P = $P_2O_5$ | A = $Al_2O_3$ |
| M = MgO | K = K2O | f = FeO | S = $SiO_2$ | H = $H_2O$ |
| L = $Li_2O$ | T = $TiO_2$ | S = $SO_3$ | C = $CO_2$ | |

According to some embodiments of the present disclosure, cements may include four main components: 1) tricalcium silicate ($Ca_3SiO_5$, or $3CaO·SiO_2$, or C3S by abbreviation) (also referred to as alite), which may provide early strength development in the cement, 2) dicalcium silicate (C2S) (also referred to as belite), which may provide the final strength of the cement, 3) tricalcium aluminate (C3A), which may contribute to the early strength development of the cement, and 4) tetracalcium alumina ferrite (C4AF). In some embodiments, gypsum ($CaSO_4·2H2O$) may be added to help control the setting time of cement (the time at which cement loses its plasticity and gains its entire strength).

According to embodiments of the present disclosure, a cement component of a cement slurry may include at least two-thirds by weight of silicates. In some embodiments, the cement may include at least 70 wt %, or at least 75 wt %, or 75 wt % to 80 wt % of silicates. For example, a cement may contain at least one silicate in an amount ranging from 70% to 90% by weight of the cement. In some embodiments, the cement may include 60 wt % to 65 wt % C3S as a major component and less than 20 wt % of C2S. The hydration products for C3S and C2S include calcium silicate hydrate and calcium hydroxide ($Ca(OH)_2$, also referred to as Portlandite), respectively. The calcium silicate hydrate (also referred to as CSH gel) may have a variable C:S:H ratio depending on the temperature, calcium concentration in the aqueous phase, and curing time. The CSH gel may form about 70% of fully hydrated cement at ambient conditions and is considered a principal binder of hardened cement. Calcium hydroxide (Portlandite) is highly crystalline and may increase the pH of the cement.

In some embodiments, the cement may be a Portland cement, such as Ordinary Portland Cement (OPC), Class A Portland Cement, Class B Portland Cement, Class C Portland Cement, Class G Portland Cement or Class H Portland Cement. Portland cement is a hydraulic cement (harden by reacting with water and form a water-resistant product) produced by pulverizing clinkers, which contain hydraulic calcium silicates and one or more of the forms of calcium sulfate as an inter-ground addition. In other embodiments, the cement may be a Saudi cement precursor, which is a combination of Portland cement and crystalline silica. Crystalline silica is also known as quartz.

In some embodiments, gypsum may be added to control the setting time of cements containing C3A. Upon contact with water, gypsum may partially dissolve and release calcium and sulphate ions to react with aluminate and hydroxyl ions produced by C3A. Further, when a C3A-containing cement is hydrated, added gypsum may react with C3A quickly to generate calcium sulfoaluminate hydrate which deposits and forms a protective film on the cement particles to hinder the hydration of C3A and delay the setting time of cement. More specifically, the reaction of gypsum and water may form a calcium trisulphoaluminate hydrate (C3A·3CS·32H, also referred to as ettringite) that may precipitate onto C3A surfaces, preventing further rapid hydration (referred to as flash-set). During such process, gypsum may be gradually consumed and ettringite continue to precipitate until the gypsum is consumed. The concentration of sulphate ion concentration may also decrease, while ettringite may become unstable and convert to calcium monosulphoaluminate hydrate. The remaining unhydrated C3A may form calcium aluminate hydrate.

Cements may be provided in a powdered or granular form, which when combined with water, may form a slurry having a paste-like or more fluid consistency.

Retarders

Retarders are cement additives that may inhibit the hydration process in cements and delay setting, which may allow sufficient time for cement slurry placement in downhole environments. In such manner, retarders may increase the thickening times of cement slurries, thereby allowing the cement slurry to be pumped into place in a well. As the downhole temperature increases, the rate of the C3S hydration process may increase, thereby decreasing the thickening time.

In general, the mechanism of retardation may include four proposed theories: adsorption, precipitation, nucleation, and complexation. According to the adsorption theory, the retarder is absorbed on the surface of the hydration products, thereby inhibiting contact with water. The adsorption theory suggests that retardation is due partially to the adsorption of the retarder onto the surface of the C—S—H gel hydration product formed around the grains of C3S rendering it hydrophobic. The precipitation theory suggests that the retarder reacts with calcium and/or hydroxyl ions in a cement slurry, forming an impermeable sheet that covers cement grains. In the nucleation theory, it is suggested that the retarder slows down the growth rate of hydration products by adsorbing on their nuclei. Finally, the complexation theory states that calcium ions are chelated by the retarder, thereby preventing the formation of the nuclei. It is possible that all of the aforementioned theories are involved to some extent in the retardation process. The predominant factor depends on the type of retarder used and the cement phases upon which the retarder acts.

A retarder according to one or more embodiments of the present disclosure may be a dark brown liquid containing sodium lignosulfonate (also referred to as sulfonated lignin), whose chemical structure is shown in FIG. 1. Lignosulfonates are water-soluble anionic polyelectrolyte polymers that are usually byproducts from the production of wood pulp using sulfite pulping.

A retarder according to one or more embodiments of the present disclosure may be a mixture including sodium hydroxide, formaldehyde, methanol, and sodium lignosulfonates. The amount of sodium hydroxide in the retarder may be less than about 5 wt %, or less than about 2 wt %, or less than about 1 wt %, based on the weight of the retarder. The amount of formaldehyde in the retarder may be less than about 5 wt %, or less than about 2 wt %, or less than about 1 wt %, based on the weight of the retarder. The amount of methanol in the retarder may be less than about 5 wt %, or less than about 2 wt %, or less than about 1 wt %, based on the weight of the retarder. The amount of sodium lignosulfonates in the retarder may be more than about 85 wt %, or more than about 90 wt %, or more than about 95 wt %, or more than about 97 wt %, based on the weight of the retarder.

The retardation mechanism of lignosulfonate may be attributed to a combination of the adsorption and nucleation theories. Sodium lignosulfonate is the functional group that is chemically responsible to delay the hydration reaction of cements. As a result, retarders according to embodiments of the present disclosure may effectively delay the initial hydration of the cements.

In cement chemistry, alkali content refers to the amount of alkali metals (Li, Na, K, Ru, Cs, and Fr) present in the cement component or mixture. Under most circumstances, the alkali content may be provided by constituents containing Na, K, or a combination thereof. The alkali content according to embodiments of the current disclosure may be calculated by first converting the mass of each alkali constituent (e.g., sodium lignosulfonate) to the mass of sodium oxide ($Na_2O$) in grams to obtain a $Na_2O$ equivalent weight. The $Na_2O$ equivalent weights of each alkali constituent are added together, and the sum is then calculated according to the volume of the admixture (i.e., natural or manufactured chemicals or additives added during cement slurry mixing) to obtain an alkali content as $Na_2O$ equivalent per liter of admixture. Because cement slurries are normally basic with a high pH, in the presence of alkali elements, the alkali hydroxides may react with other components, causing expansion and cracking over a long period of time. When pH of the cement slurry rises, insoluble derivatives of the retarders may be formed by reaction within minutes after first contact of water with cement, which forms insoluble derivatives around the cement grains as a protective layer. To optimize the performance and stability of a cement slurry, the $Na_2O$ equivalent is normally limited to a certain degree in order to prevent alkali-aggregate-reaction (AAR) including alkali-silicate-reaction (ASR) and alkali-carbonate-reaction (ACR). By using compositions according to embodiments of the present disclosure, a retarder may provide improved performance while also having a relatively low $Na_2O$ equivalent. For example, the retarder may have an alkali content of no more than 10.0 g, or no more than 7.0 g, or no more than 5.0 g, or no more than 3.0 g of $Na_2O$ equivalent/liter of admixture.

Retarders according to one or more embodiments of the present disclosure may contain lignosulfonate groups with a larger number of unsaturated groups (e.g., double bond or cyclic groups) compared with conventionally used cement retarders. Advantageously, a retarder with a larger number of unsaturated groups may be more stable under high temperature. Moreover, a relatively larger amount of unsaturated compounds (cyclic) and the attached sulfur group (which are electron donating groups), and reduction of the $Ca^{+2}$ in the cement composition may increase reactivity of retarders according to embodiments of the present disclosure, which may provide an improved retarding impact on the setting time of the cement slurry.

In some embodiments, a retarder may include at least one of the following: $OCH_3$ group, isolated sulfur group, aldehyde group, or any combination thereof. It is noted that the OCH$_3$ group on the aromatic ring structure of a sodium lignosulfonate in retarders according to embodiments of the present disclosure may be at a different position, depending on the subunit of lignin. Isolated sulfur groups may be any functional group that includes one or more sulfur atoms and may include, for example, sulfur groups such as —SO$_3$H, mercaptan (or thiol) RSH, sulfide (or thioether) RSR', disulfide RSSR', and sulfoxide RSOR', where R and R' represents any molecular structure. An isolated sulfur group, as an electron donating group, may interact with calcium ions, which may provide a strong retarding impact on the setting time of the cement slurries.

A retarder according to embodiments of the present disclosure may be applicable in a temperature larger than about 100° F., or about 100° F. to about 195° F., or about 125° F. to about 195° F. The retarder may provide an adequate thickening time of hours. For example, the retarder disclosed herein may provide a thickening time of at least 4 hours under downhole temperatures of about 125° F. or greater.

Retarders according to embodiments of the present disclosure may have improved thermal stability when compared with conventionally added retarding agents in downhole cement. For example, in some embodiments, a retarder may have a weight loss of that ranges from about 0% to about 50%, when the retarder is heated from ambient temperature to 400° C., as measured using thermogravimetric analysis (TGA). In some embodiments, retarders according to embodiments of the present disclosure may have weight loss when heated from 0° C. to 400° C. ranging from a lower limit of 0%, 5%, or 10% to an upper limit of 40%, 45% or 50%, where any lower limit may be paired with any upper limit.

Sodium borate salts (e.g., borax) and boric acid are known to be effective retarder enhancers. However, these chemicals are not always compatible with some other high-temperature additives and, therefore, may impair the fluid loss control and rheology of cement slurries. Advantageously, retarders according to embodiments of the present disclosure may provide improved retarding effects to a cement slurry without the use of borate or boric acid (such that cement slurries according to embodiments of the present disclosure do not contain borate or boric acid).

Additives

In cement slurry design, additives may be used to alter or inhibit the hydration reactions in the cement slurry. According to embodiments of the present disclosure, various chemicals may be applied as additives to ensure operable properties including mixability, stability, rheology, fluid loss, and adequate thickening time. These additives may include retarders, such as discussed above, fluid loss additives, dispersants, gas migration additives, expansion additives, or any combination thereof. In some embodiments, a bi-functional additive may be added to a cement slurry. For example, an additive derived from a readily available and relatively inexpensive material such as lignin may be used for both inhibition of fluid loss and retarding the thickening of the cement slurry.

In some embodiments, a cement slurry may optionally include additives such as suspending agents, cement accelerators, cement extenders, weighting agents, lost circulation materials, fluid loss additives, dispersants, gas migration additives, defoamers, expansion additives, solvents, and combinations thereof. Cement accelerators may include, for example, calcium chloride, sodium chloride, sodium metasilicate, potassium chloride, gypsum, and combinations thereof. Cement extenders may include, for example, bentonite, sodium silicate, volcanic ash, diatomaceous earth, perlite, and combinations thereof. Weighting agents may include, for example, hematite, ilmenite, barite, and combinations thereof. Fluid loss additives may include, for example, polymer additives such as cellulose, polyvinyl alcohol, polyalkanolamines, polyacrylamides, liquid latex, and combinations thereof. Loss circulation materials may include, for example, ground coal, ground gilsonite, ground walnut hull, and combinations thereof.

In some embodiments, the cement slurry may include a suspending agent. Suspending agents are compounds that may increase the viscosity of the cement slurry and aid in suspending cement particles in water. Suspending agents may be hydrophilic polymers, such as hydroxyethyl cellulose (HEC), polyhydroxylated polyacrylamide (PHPA), or acrylic and acrylamide-based polymers. In some embodiments, a cement slurry may include a suspending agent in an amount sufficient to suspend cement particles in the mixture and achieve a desired viscosity and uniform density. For example, if too much suspending agent is used, the cement slurry may be too viscous for pumping into a formation. If too little suspending agent is used, cement particles may not be effectively suspended in the cement slurry, and some cement particles may begin to settle during the curing process, resulting in a non-uniform density in the cement. In some embodiments, a cement slurry may contain from about 0.1 wt % to about 3.0 wt % of suspending agent by weight of the cement slurry.

A cement slurry may have any suitable viscosity for use in cementing formations. For example, a cement slurry may be designed to have a viscosity that allows the cement slurry to be pumped through downhole tubing and back up between an annulus formed between a well casing and a formation.

Cement slurries may have any suitable slump for use in cementing formations. Slump is a measure of concrete consistency and fluidity. Slump may be determined by placing a conical-shape metal mould with specific dimensions on a flat surface, filling the metal mould with the cement slurry, removing the mould, and measuring the distance from the top of the slumped cement slurry to the level of the top of the metal mould. In some embodiments, a cement slurry may have a slump ranging from about 20 mm to about 200 mm. For example, a cement mixture may have a slump ranging from a lower limit of 20, 30, or 40 mm to an upper limit of 100, 150, or 200 mm, where any lower limit may be used in combination with any upper limit.

Example 1

A cement slurry having a retarder according to embodiments of the present disclosure ("Retarder 1") was mixed and analyzed. Retarder 1 was a sodium lignosulfonate composition as described herein. Retarder 1 contained lignosulfonate groups with a larger number of unsaturated groups compared to a reference retarder containing sodium polynaphthalene sulfonate polymer. Retarder 1 also included OCH$_3$ groups, sulfur groups, and aldehyde groups. The specific gravity of Retarder 1 was between 1.1 to 1.5 g/cm$^3$ at a temperature of 20° C. The reference retarder contained aromatic groups with lignosulfonate, for example sodium polynaphthalene sulfante, and had a specific gravity of 1.24 to 1.26 g/cm$^3$ at a temperature of 27° C. The reference retarder that was compared in Example 1 was Schlumberge D81 retarder, which has sodium polynaphthalene sulfonate as the main component in its chemical composition, and has a structure represented by the formula:

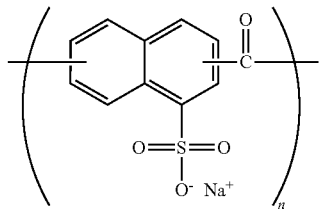

Figure 2:
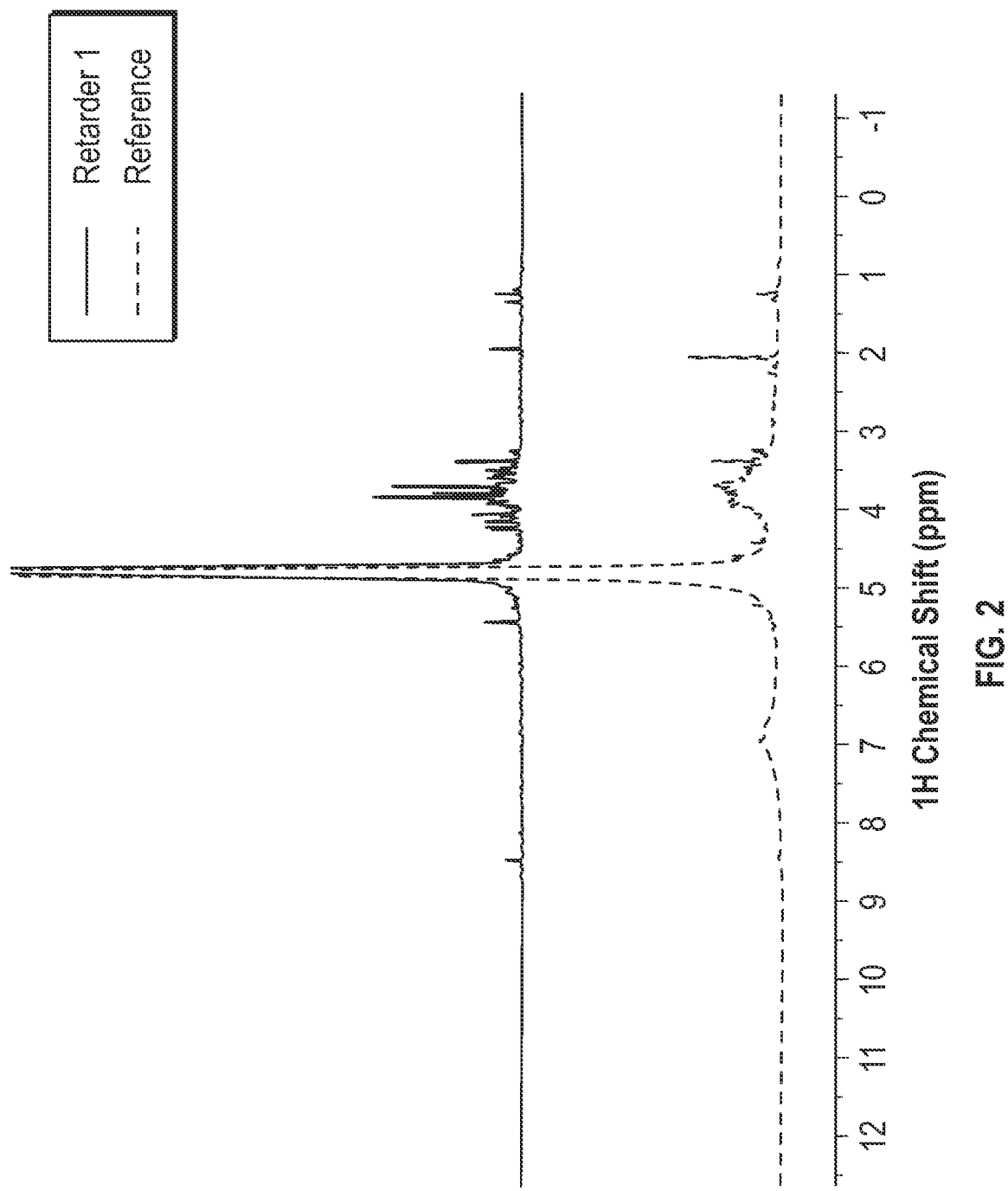
FIG. 2 shows NMR spectra of a retarder according to embodiments of the present disclosure and a reference retarder.

The functional groups of Retarder 1 and the reference retarder were characterized by proton nuclear magnetic resonance (1H NMR). As shown in FIG. 2, the NMR spectrum of the reference retarder has a peak at 7 ppm chemical shift indicating a proton from aromatic group, which is not observed for retarders according to embodiments of the present disclosure, such as Retarder 1. The peaks at 3-4 ppm chemical shift in the NMR spectrum of the Retarder 1 indicates a large number of unsaturated groups (groups having double bonds), such as $OCH_3$ and isolated sulfur groups. In comparison, the peaks at 3-4 ppm are weak in intensity for the reference retarder. In addition, a peak in the chemical shift of 8.5-9 ppm indicates the existence of aldehydes group in Retarder 1.

Figure 3:
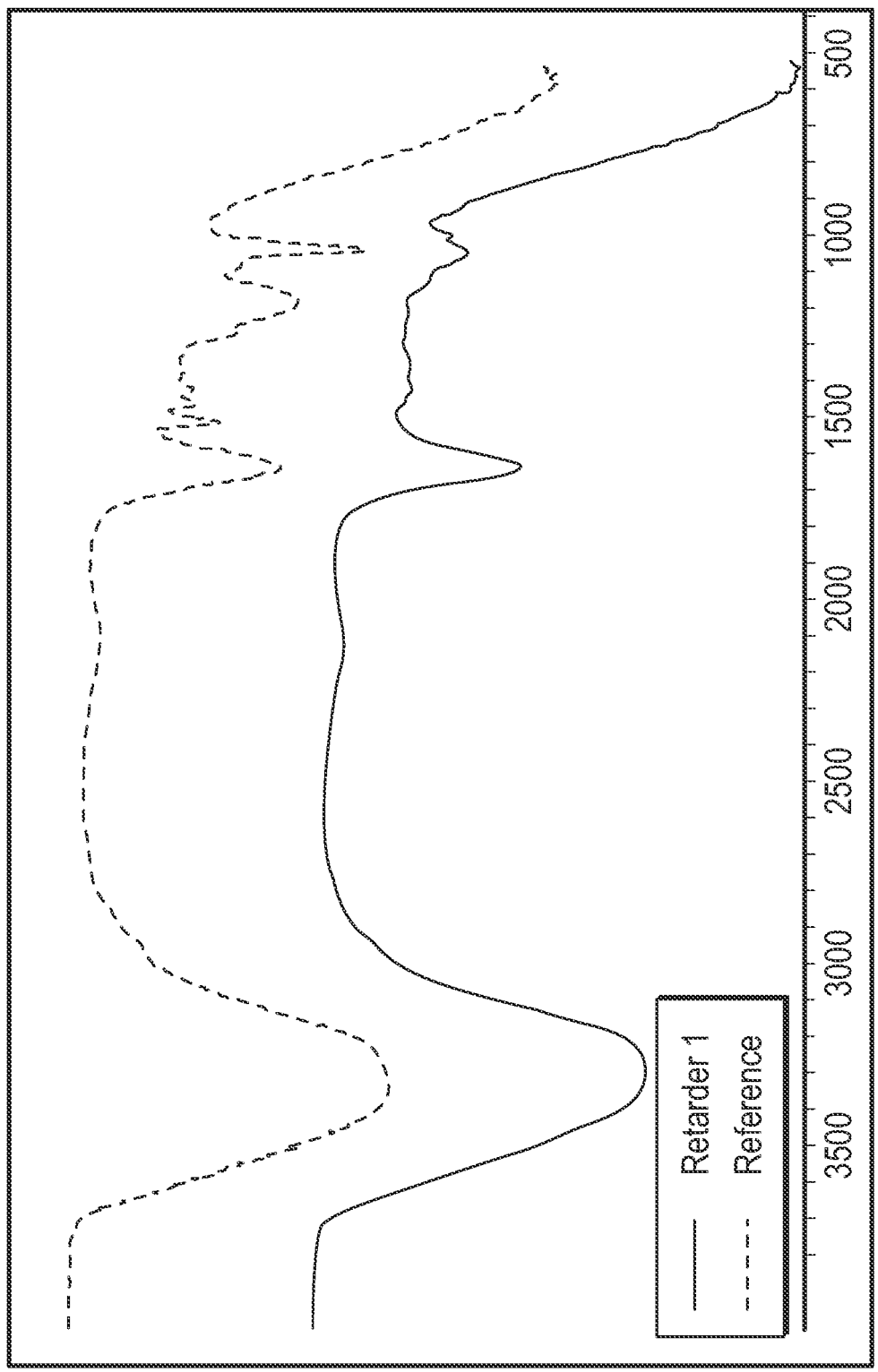
FIG. 3 shows FTIR spectra of a retarder according to embodiments of the present disclosure and a reference retarder.

FIG. 3 shows the Fourier transform infrared analysis (FTIR) spectra of Retarder 1 and the reference retarder. The differences shown by the FTIR spectra may be attributed to, for example, C—O vibrations (e.g. in the —COOR groups of crocetin)/amide II/aromatic —C=C stretching vibrations) shown in the 1580-1578 (medium) and 1545-1542 (sharp) wavenumber range; C—H bending (scissoring) (in $CH_3$ groups)/aromatic —C=C stretching vibrations shown around the 1454 (weak) wavenumber; —OH bending vibrations, —C—O—H in-plane bending vibrations, —$CH_3$ out-of-plane bending vibrations, and —$CH_2$ wagging and twisting vibrations shown around the 1400 (weak) and 1375 (weak) wavenumbers; C(O)—O stretching vibrations and —OH in plane vibrations/amide III (e.g. in aromatic ethers) shown around the 1317 (weak), 1294-1292 (weak), 1271 (weak) and 1227 (strong) wavenumbers; and C—O stretching vibrations (e.g. in C—O—C glycosidic linkages of oligosaccharides or in triacylglycerols) shown around the 1157 (sharp) wavenumber.

Figure 4:
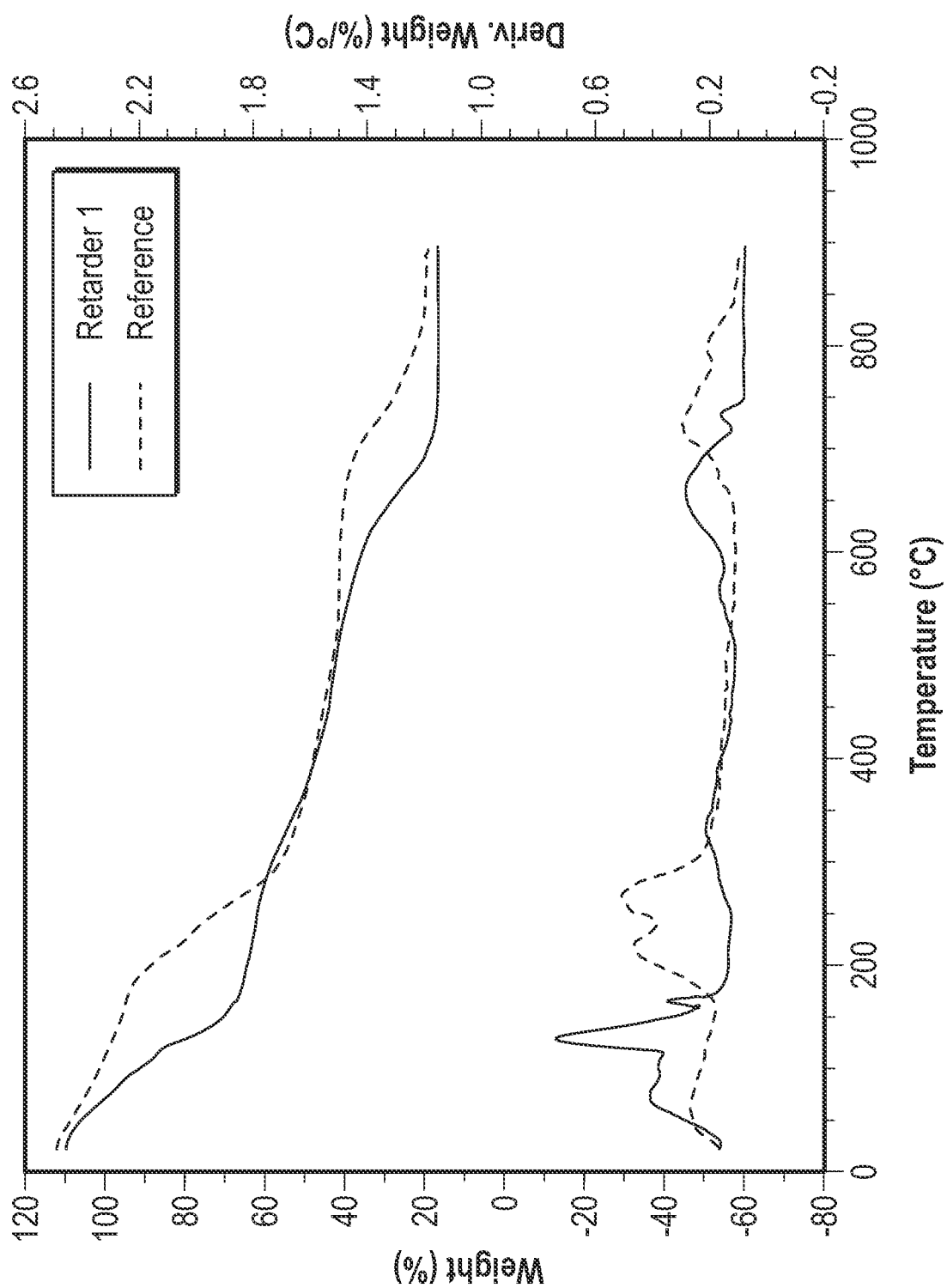
FIG. 4 shows TGA spectra of a retarder according to embodiments of the present disclosure and a reference retarder.

FIG. 4 shows the thermogravimetric analysis (TGA) curve of Retarder 1. The TGA results show that Retarder 1 has a good thermal stability, and the weight loss of the retarder when tested under temperatures ranging from 0° C. to 400° C. (32° F. to 752° F.) does not exceed 50% of the initial amount of retarder. The good thermal stability enables Retarder 1 to be used in the downhole conditions (e.g., in high pressure and high temperature environments).

Example 2

Cement slurry compositions were prepared without Retarder 1 (Sample #1) and with Retarder 1 (Sample #2 and #3) in different water to cement (W/C) ratios, where Sample #2 had a cement slurry with a water to cement ratio of 0.65, and Sample #3 had a cement slurry with a water to cement ratio of 0.572, as shown in Table 1 below. Table 1 shows results from a compressive test measuring the maximum amount of compressive load at different days conducted on the three samples of cured cement slurries. The cement slurries were cured for 3 days, 7 days and 28 days prior to conducting the compressive test. The compressive tests were conducted by placing a cured sample of the cement slurries in a tensile machine. A compressive test fixture was used to place the samples under compressive force until failure. The maximum compressive load was recorded, and the compressive strength was calculated by diving the maximum compressive load by the cross-sectional area of the sample.

TABLE 1

Characterization of cement slurries with and without Retarder 1

| | Retarder 1 (Liter/50 kg Cement) | W/C Ratio | Slump (mm) | Compressive Strength ($N/mm^2$) | | | Density ($kg/m^3$) |
| --- | --- | --- | --- | --- | --- | --- | --- |
| | | | | 3 days | 7 days | 28 days | |
| #1 | 0 | 0.65 | 60 | 10.2 | 13.1 | 16.7 | 2368 |
| #2 | 0.15 | 0.65 | 130 | 10.5 | 13.5 | 17.1 | 2348 |
| #3 | 0.15 | 0.572 | 65 | 16.1 | 19.3 | 25.7 | 2378 |

As shown in Table 1, adding Retarder 1 according to embodiments of the present disclosure to cement slurries may improve the compressive strength of the cured cement regardless of the length of the cure time. Cement slurries having Retarder 1 showed increased workability (indicated by the higher slump values) and increased strength when compared with a control cement slurry without Retarder 1. Further, additional increase in the compressive strength may be a result of the reduced W/C ratio. Table 1 shows that increased workability may be obtained at an original water to cement ratio (W/C) (i.e., having the same water to cement ratio as the control cement slurry) and increased strength may be obtained while workability is maintained and the water to cement ratio is reduced.

Example 3

Cement slurry compositions with and without Retarder 1 were also prepared as shown in Table 2 and Table 3. The testing results of the cement slurry compositions with and without Retarder 1 are shown in Table 4. The bottomhole circulating temperature (BHCT) was 125° F. A significantly long thickening time of more than 4 hours was obtained with the presence of Retarder 1.

TABLE 2

| Cement slurry composition with no retarders | |
| --- | --- |
| Composition | Mass (g) |
| Water | 355.04 |
| Defoamer | Few drops |
| Cement | 800 |

TABLE 3

Cement slurry composition with Retarder 1

| Composition | Mass (g) |
|---|---|
| Water | 345.85 |
| Retarder 1 | 8.22 |
| Cement | 800 |

TABLE 4

Testing results of cement slurries with and without Retarder 1

|  | No retarder | Retarder 1 |
|---|---|---|
| Thickening time | 1.75 hrs | >4 hrs |
| BHCT | 125° F. | 125° F. |
| Test Temperature | 125° F. | 125° F. |
| Ramp Time | 30 min | 30 min |
| BC Final | 100 |  |
| Pressure | 5200 psi | 5200 psi |
| Density | 118 | 118 |

Thickening time tests were conducted on compositions with and without Retarder 1 in different temperatures, and Retarder 1 was shown to provide improved thickening times in a wide range of low and high temperature applications (e.g., from about 100° F.-195° F.).

Methods and Systems for Using Cement Slurries Downhole

Embodiments disclosed herein relate generally to a method for applying a cement slurry in a wellbore. Methods for applying a cement slurry in a wellbore may include mixing a cement, water, and a retarder to form the cement slurry, wherein the cement slurry may have 60% to 80% of the cement, 20% to 40% of water, and 0.1% to 2% of the retarder, by weight of the cement slurry, and wherein the retarder comprises sodium lignosulfonate with an alkali content of no more than 5.0 g Na$_2$O equivalent/liter of admixture. In some embodiments, the water and retarder may be introduced into the cement at a certain mixing speed. After the water has been introduced into the cement, the cement slurry may be mixed for a time and at a mixing speed suitable for obtaining a homogeneous mixture. The cement slurry may be mixed at the surface, e.g., at the well site or at a location other than the well site, where the mixed cement slurry may be transported to the well. Once mixed, the cement slurry may be pumped downhole into the well. In some embodiments, the cement slurry is pumped through downhole tubing and into an annular space formed between the downhole tubing and a wellbore wall of the well.

Figure 5:
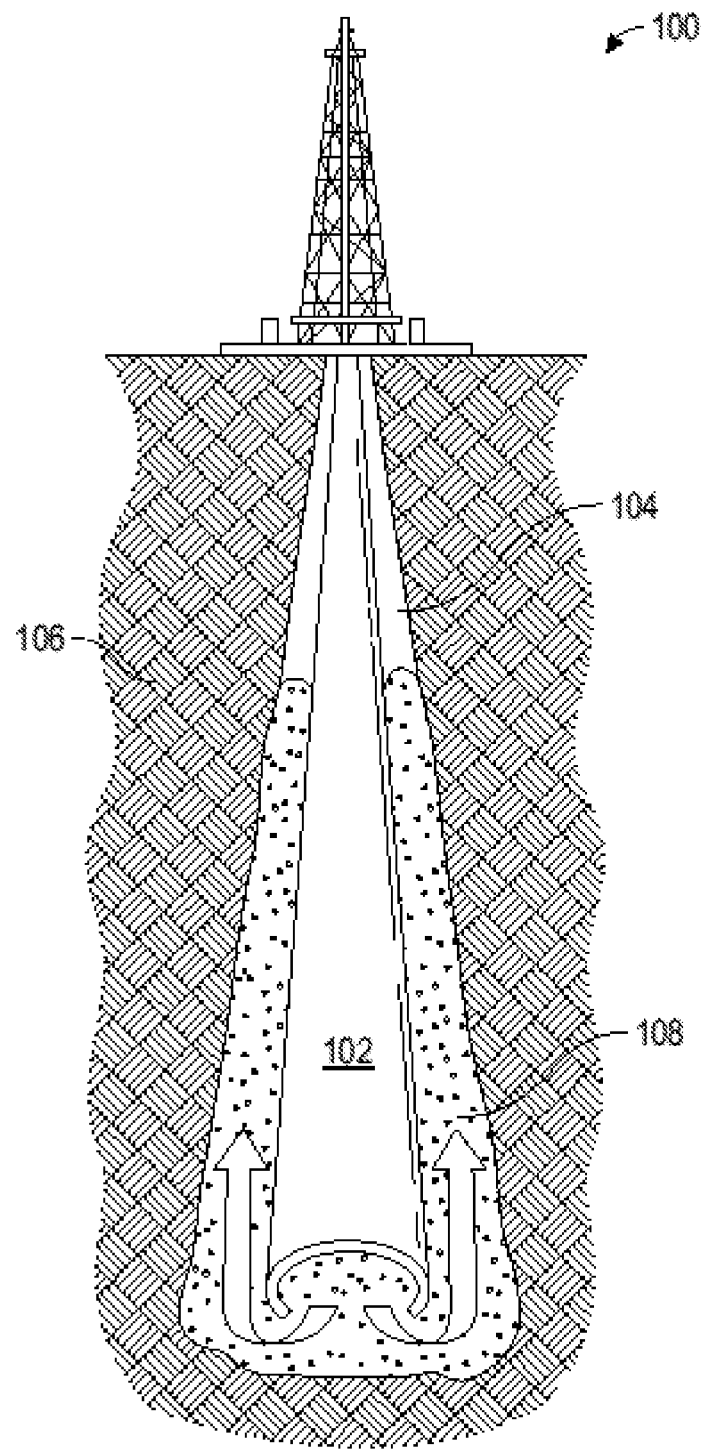
FIG. 5 shows a well system according to embodiments of the present disclosure.

For example, FIG. 5 shows a well system 100 according to embodiments of the present disclosure where a cement slurry 108 may be pumped into a well. As shown, a cement slurry 108 according to embodiments disclosed herein may be pumped downhole through downhole tubing, e.g., a casing 102. The cement slurry 108 may then be pushed up into an annulus 104 formed between the formation 106 and the casing 102. The direction of cement slurry flow is indicated by arrows (not labeled). After the cement slurry 108 has been introduced into the well and pumped into the annulus 104, the cement slurry 108 may be held in place in the wellbore until it cures, such that a sheath of cured cement may be formed in the annulus 104 of the well. The cement slurry 108 may be held in the annulus 104, for example, by maintaining a pressure at the bottom of the wellbore until the cement slurry 108 cures. In some embodiments, the well system further comprises drilling mud and replacement fluid, which may be used during drilling the well.

Once the cement slurry 108 cures, the hardened cement sheath may hold the casing 102 in place, and further well operations may be conducted, including, for example, farther drilling, resource production, testing, and others. By using cement slurries according to embodiments of the present disclosure having longer thickening times to line the well, the cement may be filled into more area of the annulus 104, which may provide a stronger well lining.

Cement slurries according to embodiments disclosed herein may also be used for well operations other than lining a well. By using cement slurries according to embodiments of the present disclosure, the cement slurry may have longer thickening times in downhole environments and under increased temperatures. With longer thickening times, and thus improved workability, more accurate placement of the cement slurry in the downhole application may be achieved. In such manner, cement slurries according to embodiments of the present disclosure may be uniquely suited for well operations under high temperatures (e.g., temperatures greater than 125° F.) in addition to being successful in lower temperatures. Further, by using cement slurries according to embodiments of the present disclosure in well operations, the hardened cement may have increased strength when compared to cement slurries that do not include retarder compositions of the present disclosure.

Although only a few example embodiments have been described in detail, those skilled in the art will readily appreciate that many modifications are possible in the example embodiments without materially departing from the scope of the disclosure. Accordingly, all such modifications are intended to be included within the scope of this disclosure as defined in the following claims.

What is claimed:

1. A system, comprising:
a well extending through a downhole formation;
a cement slurry held within a portion of the well, the cement slurry comprising:
  a cement in amount of 58% to 79.9% by weight of the cement slurry, wherein the cement comprises 70% to 90% of at least one silicate by weight of the cement;
  water in amount of 20% to 40% by weight of the cement slurry; and
  an admixture including a retarder in amount of 0.1% to 2% by weight of the cement slurry, wherein the retarder comprises sodium lignosulfonate with an alkali content of no more than 5.0 g Na$_2$O equivalent/liter of the admixture and methanol in an amount of greater than 0 and less than 5 wt % based on weight of the retarder;
wherein the retarder lengthens thickening time of the cement slurry at a temperature range from 100° F. to 195° F.

2. The system according to claim 1, wherein the retarder comprises at least one of a OCH$_3$ group, isolated sulfur group, and aldehyde group.

3. The system according to claim 1, wherein the retarder has a thermal stability characterized in that a weight loss of the retarder is no more than 50% after the retarder is heated from 0° C. to 400° C.

4. The system according to claim 1, wherein the cement is 65% to 75% and the water is 24.9% to 34.9%, by weight of the cement slurry.

5. The system according to claim 1, wherein the retarder is 0.5% to 1% by weight of the cement slurry.

6. The system of claim 1, wherein the cement slurry does not contain borate.

7. The system of claim 1, wherein the portion of the well has a temperature of 125° F. to 195° F.

8. The system of claim 1, wherein the retarder has a specific gravity ranging between 1.16 to 1.5 at 20° C.

9. A method for applying a cement slurry in a well, the method comprising:
   mixing a cement, water, and an admixture to form the cement slurry;
      wherein the admixture comprises a retarder comprising sodium lignosulfonate with an alkali content of no more than 5.0 g $Na_2O$ equivalent/liter of the admixture and methanol in an amount of greater than 0 and less than 5 wt % based on weight of the retarder,
      wherein the cement slurry has 58% to 79.9% of the cement, 20% to 40% of the water, 0.1% to 2% of the retarder, by weight of the cement slurry, and
      wherein the retarder lengthens thickening time of the cement slurry at a temperature range from 100° F. to 195° F., and
   pumping the cement slurry into the well.

10. The method according to claim 9, wherein the retarder comprises $OCH_3$ groups, isolated sulfur groups, and aldehyde groups.

11. The method according to claim 9, wherein the cement is 65% to 75% and the water is 24.9% to 34.9%, by weight of the cement slurry.

12. The method according to claim 9, wherein the retarder is 0.5% to 1% by weight of the cement slurry.

13. The method of claim 9, wherein the well has a downhole temperature of 125° F. to 195° F.

14. The method of claim 9, wherein the cement slurry is pumped through downhole tubing and into an annular space formed between the downhole tubing and a wellbore wall of the well.

15. The method of claim 9, wherein the cement slurry does not contain borate.

16. The method of claim 9, wherein the retarder has a specific gravity ranging between 1.16 to 1.5 at 20° C.

17. The method of claim 9, wherein the retarder has a thermal stability characterized in that a weight loss of the retarder is no more than 50% after the retarder is heated from 0° C. to 400° C.

18. The method of claim 9, further comprising adding at least one other additive to the admixture.

* * * * *